United States Patent [19]

Inaba et al.

[11] Patent Number: 5,062,784
[45] Date of Patent: Nov. 5, 1991

[54] MOLDING CONDITION RECORDING APPARATUS FOR AN INJECTION MOLDING MACHINE

[75] Inventors: Yoshiharu Inaba, Kawasaki; Hideo Naito, Hino; Masao Kamiguchi; Noriaki Neko, both of Yamanashi; Shinsuke Sakakibara, Komae, all of Japan

[73] Assignee: Fanuc Ltd., Minamitsuru, Japan

[21] Appl. No.: 432,744

[22] PCT Filed: Mar. 28, 1989

[86] PCT No.: PCT/JP89/00326

§ 371 Date: Oct. 25, 1989

§ 102(e) Date: Oct. 25, 1989

[87] PCT Pub. No.: WO89/09126

PCT Pub. Date: Oct. 5, 1989

[30] Foreign Application Priority Data

Mar. 28, 1988 [JP] Japan .................................. 63-71904

[51] Int. Cl.$^5$ .............................................. B29C 45/77
[52] U.S. Cl. .................................. 425/143; 264/40.3; 264/40.1; 425/145; 425/149; 425/150; 425/170; 425/171
[58] Field of Search ............... 425/143, 135, 144, 145, 425/149, 148, 150, 169, 170, 171; 264/40.1, 40.3, 40.4, 40.5, 40.7

[56] References Cited

FOREIGN PATENT DOCUMENTS 114831 6/1986 Japan .
248722 11/1986 Japan .
61-261418 11/1986 Japan .
62-197262 8/1987 Japan .
62-261418 11/1987 Japan .
63-51119 3/1988 Japan .

Primary Examiner—Timothy Heitbrink
Attorney, Agent, or Firm—Staas & Halsey

[57] ABSTRACT

A molding condition recording apparatus having a manual data input device with a CRT. The manual data input device has various keys for inputting parameters of various groups used for controlling injection, hold, metering and cylinder temperature, and for inputting molding defect indication data. A microprocessor for a programmable machine controller causes the input parameters and the molding defect indication data to be stored in a molding condition storage region of a shared memory (S5). The microprocessor then discriminates similarity between the thus stored molding condition and the molding condition already registered in a molding condition/molding defect storage file of a memory other than the shared memory (S7). If there is similarity between these molding conditions, the microprocessor causes the CRT to display an alarm message thereon together with the parameter already registered in the file and the mold defect indication data (S12). When there is no similarity between the molding conditions, the microprocessor transfers the molding condition stored in the shared memory to the file for storage therein. Even when the alarm message is displayed, a similar transfer and storage process is carried out if it is requested by an operator (S13).

5 Claims, 2 Drawing Sheets

MOLDING CONDITION RECORDING APPARATUS FOR AN INJECTION MOLDING MACHINE

BACKGROUND OF THE INVENTION

1. Field of the Invention

The present invention relates to a molding condition recording apparatus for an injection molding machine, capable of recording one or more histories of processes for determining optimum molding conditions. Using the present invention, optimum molding conditions are determined with plural sets of molding conditions which are individually set. If the result of a process is successful, the conditions which precipitated the result can be duplicated using the history of the conditions recorded by the present invention. Conversely, if the result of certain molding conditions is defective, the conditions which precipitated the result can be avoided using the history of conditions recorded by the present invention.

2. Description of Related Art

Molding conditions for carrying out an injection molding process including a series of steps, such as an injection, hold, metering, etc., involve various parameters. Accordingly, the optimum molding conditions for manufacturing non-defective molded products are generally determined through trial and error. More specifically, the injection molding process is carried out in accordance with tentatively set molding conditions. After inspection of the resulting molded product, one or more parameters of the molding conditions are changed according to the quality of molded products obtained. The injection molding process is again carried out with the modified molding conditions. This procedure is repeated to obtain the optimum molding conditions. The optimum molding conditions determined in this manner are stored in a recording apparatus of an injection molding machine, so that the injection molding process is carried out in accordance with the stored optimum molding conditions.

It is known, for example, from Japanese Patent Disclosure No. 61-114831, that molding conditions can be stored in a mold data table corresponding to mold numbers. According to this prior art, when a mold number representing a particular mold is designated before the execution of the injection molding process, optimum molding conditions for this mold are displayed. It is also known that the optimum molding conditions can be stored in a setting memory, and then written into a molding condition file memory correspondingly to mold types (Japanese Patent Disclosure No. 61-248722). In this prior art, the optimum molding conditions for a mold type to be used are transferred from the molding condition file memory to the setting memory, and the injection molding process is carried out in accordance with the optimum molding conditions stored in the setting memory. It is also known that the optimum molding conditions stored in the aforesaid manner can be printed out (Japanese Patent Disclosure No. 62-261418).

As described, the prior art apparatuses are designed to store or print only the optimum molding conditions. Accordingly, when determining or correcting optimum molding conditions because of defective molding produced by the injection molding process in accordance with once-determined optimum molding conditions the injection molding process should be repeated while parameters of the molding conditions are changed many times. It is, however, difficult to grasp entire processes of changing the molding conditions involving numerous parameters, and therefore, it frequently happens that molding conditions similar to those which were already tested and found to produce defective molding are inadvertently used to carry out the injection molding process which leads to a waste of time.

SUMMARY OF THE INVENTION

The object of the present invention is to provide a molding condition recording apparatus for an injection molding machine, which can be used to quickly determine optimum molding conditions for manufacturing non-defective molded products.

In order to achieve the above object, a molding condition recording apparatus of the present invention comprises a first input means operable by an operator, for changeably inputting parameters constituting one set of molding conditions which consists of plural groups of parameters. The molding condition recording apparatus also has a first memory means for changeably storing the parameters constituting the one set of molding conditions, and a second memory means for storing plural sets of molding conditions including one or more sets of molding conditions that cause defective molding and one or more process histories for determining optimum molding conditions. The present invention further has a second input means operable by an operator for inputting a command to transfer the molding conditions stored in the first memory means to the second memory means, and control means for controlling the first and second memory means in response to an operation of the first and second input means.

Preferably, the molding condition recording apparatus further comprises third input means operable by an operator, for inputting data representing types of defective molding. Using the third input means, data representing types of defective molding can be stored in the second memory means. Also a preferred feature, the molding condition recording apparatus further comprises discrimination means and display means which are operated under the control of the control means. The discrimination means operates to discriminate similarly between a parameter inputted through the first input means and a corresponding parameter stored in the second memory means each time a parameter is inputted through the first input means. The display means operates to display the result of the similarity discrimination. Another preferred feature is an alarm on the display means which activates when the discrimination means judges that a molding condition identical with that inputted through the first input means has already been stored in the second memory means.

As mentioned above, according to the present invention, since plural sets of molding conditions including those that cause defective molding and those that represent a history of processes for determining optimum molding conditions are stored, and as a preferred feature the result of discrimination of the similarity between the inputted molding conditions and the stored molding conditions is displayed, molding condition change processes are easily comprehended when determining or correcting the optimum molding conditions. Unnecessary repetition of the injection molding process in accordance with similar molding conditions can also be eliminated, thereby allowing fast determination of the optimum molding conditions. Furthermore, since data representing the type of defective molding is, as a preferred feature, stored in memory, it is possible to obtain a correlation between the molding conditions and defective molding.

DESCRIPTION OF THE PREFERRED EMBODIMENTS

Figure 1:
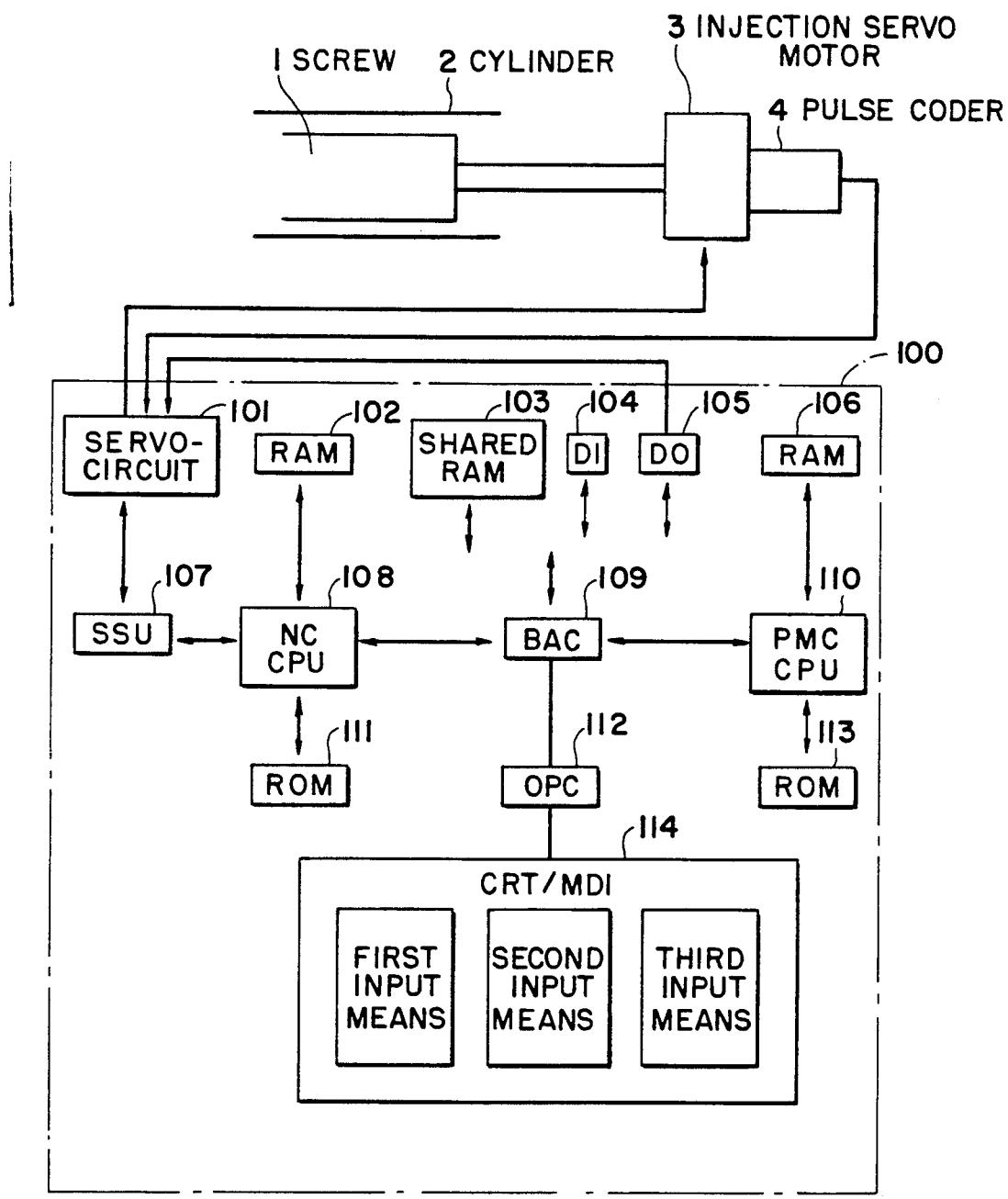
FIG. 1 is a schematic block diagram illustrating a principal part of an injection molding machine equipped with a molding condition recording apparatus according to an embodiment of the present invention.

Referring to FIG. 1, an injection molding machine is provided with an injection servomotor 3 for driving a screw 1 disposed in a cylinder 2 in the axial direction, a pulse coder 4 mounted to the servomotor 3, and a numerical control unit (hereinafter referred to as NC unit) 100 for controlling the injection molding machine. FIG. 1 shows only those elements associated with an injection axis of the injection molding machine, but it is to be noted that the injection molding machine comprises other various mechanisms such as a programmable machine controller for sequence control, a molding clamping device, an ejector, etc. The injection molding machine is also arranged to carry out a multi-stage control for the injection speed, hold pressure and back pressure in accordance with a screw position and a time parameter. The injection molding machine also has the capability to control the temperatures of various portions of the cylinder 2.

The NC unit 100 comprises a microprocessor for numerical control (hereinafter referred to as NCCPU) 108, which is connected to a ROM 111 storing a monitor program for global control of the injection molding machine, and a RAM 102 which is used for temporary storage of data, and the like. Also connected to the NCCPU 108 through a servo-interface 107 are servo-circuits for controlling the operation of various axes (only a servo-circuit 101 associated with the injection servomotor 3 is illustrated). A microprocessor for a programmable machine controller (hereinafter referred to as PMCCPU) 110 is connected to both a RAM 106 having a backup power supply, and a ROM 13 which stores both a sequence program for controlling a sequence operation of the injection molding machine and other data. The NC unit 100 is also provided with a bus arbiter controller (hereinafter referred to as BAC) 109 for controlling the selection of buses to be used at certain times for control execution. The BAC 109 is connected to the buses of the CPUs 108 and 110, a shared RAM 103, an input circuit 104, an output circuit 105, and is also connected through an operator panel controller 112 to a manual data input device with a CRT (hereinafter referred to as CRT/MDI) 114.

A molding condition recording apparatus according to an embodiment of the present invention, which is installed in the injection molding machine constructed as above, comprises the aforementioned elements 103, 106, 110 and 114 as its principal elements.

In this embodiment, a set of molding conditions for carrying out an injection molding process comprises plural groups of parameters, each group including one or more parameters. For example, a parameter group for injection control includes, as parameters, the number of injection stages, a target injection speed for each of the injection stages, and a screw position for changeover of each target injection speed. A parameter group for hold control includes the number of hold stages, and a target hold pressure and target hold time for a respective hold stage. Similarly, a parameter group for metering control includes the number of metering stages, a target back pressure for each metering stage, and a screw position for changeover of each target back pressure. A parameter group for cylinder temperature control includes target temperatures for various portions of the cylinder 2.

The CRT/MDI 114, which is an element of the molding condition recording apparatus and functions as first to third input means and display means, comprises various keys such as software keys, a ten-key pad for inputting and displaying the aforementioned various parameters, and a CRT screen. In this embodiment, each of the software keys is adapted to provide different functions in different operation modes, as is known in the art, so that a greater number of functions than the number of the software keys can be achieved.

The shared RAM 103 functions as first memory means and has a molding condition storage region for storing various parameter values constituting one set of molding conditions. The RAM 106 serves as second memory means, and comprises a molding condition/defective molding storage file (hereinafter referred to as molding condition storage file) TE for storing one or more records. One record consists of one of plural sets of molding conditions representing process histories for determining one set of optimum molding conditions, and defective molding data associated with the corresponding set of molding conditions. The RAM 106 also comprises a first register for storing a value C indicating the last record, and a second register for storing the type and value of input parameters. The PMCCPU 110 functions as control means and discrimination means. In response to an operation of certain keys, the PMCCPU 110 operates to store the value of an input parameter in the corresponding memory area of the molding condition storage region of the shared RAM 103, and discriminate similarity between this stored value of the input parameter and the corresponding parameter value stored in the molding condition storage file of the RAM 106. The PMCCPU 110 can also transfer a set of molding conditions stored in the molding condition storage region to the molding condition storage file, and cause the CRT/MDI 114 to display various screens including a molding condition setting screen, and the functions of the software keys in respective operation modes.

The operation of the above-described injection molding machine provided with the molding condition recording apparatus will now be described.

In order to determine optimum molding conditions, an operator first operates a software key of the CRT/MDI 114 for selection of the molding condition setting screen. In response to the key operation, the PMCCPU 110 causes the CRT/MDI 114 to display the molding condition setting screen on the CRT thereof. Then, as the operator operates certain keys to input various parameters constituting one set of tentative molding conditions in accordance with the type of a mold, the type of a molding material, etc., the PMCCPU 110 causes corresponding memory areas of the molding condition storage region of the shared RAM 103 to store the input parameters.

Subsequently, the operator puts the injection molding machine into operation to carry out a tentative injection molding process. The NC unit 100 controls the injection molding machine in accordance with an NC program stored in the shared RAM 103, the sequence program stored in the ROM 113, and the molding conditions stored in the molding condition storage region of the shared RAM 103, in a conventionally known manner. While the PMCCPU 110 performs sequence control, the servo-circuits for various axes, which are supplied with distribution pulses from the NCCPU 108 via the servo-interface 107 and feedback pulses from the corresponding pulse coders, perform a D/A conversion of the deviation between an actual position of the respective servomotor and a commanded position thereof. The servo-circuits use the deviation to obtain a speed command, perform an F/V conversion of the output from the respective pulse coder to obtain an actual speed, and supply the respective servomotor with a driving current corresponding to the result of the comparison between the speed command and the actual speed. The driving current is also related to a torque limit value from the PMCCPU 110 which controls the output torque of the respective servomotor.

After the tentative injection molding process is carried out once (in general, i times; $i=(1, 2, \ldots, C)$) by the injection molding machine generally controlled in the aforesaid manner, the operator examines whether or not molded products manufactured by the tentative process are defective. The molded products manufactured at this time frequently have various defects, such as flashes, sink marks, etc. In such cases, the operator again operates the software key for selection of the molding condition setting screen, to change one or more of the various parameters of the tentatively set molding conditions.

Figure 2:
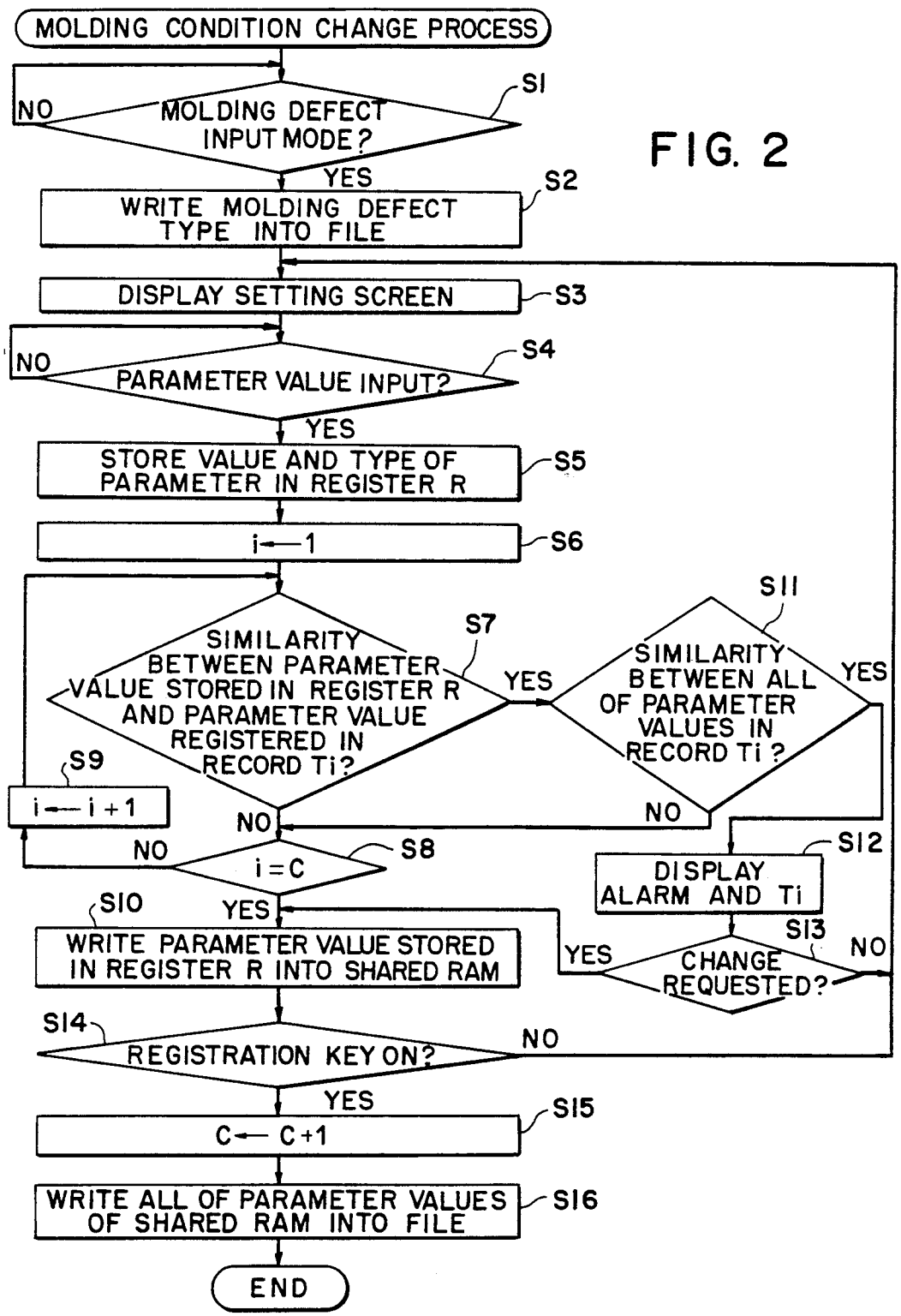
FIG. 2 is a flowchart of a molding condition change process executed by the apparatus of FIG. 1.

Now referring to FIG. 2, a molding condition change process executed by the PMCCPU 110 in response to the above-mentioned key operation will be described. It is noted that the following description is based on the assumption that the tentative injection molding process has already been carried out C times.

First, in response to an operation of the aforesaid setting screen selection key, the PMCCPU 110 causes the CRT to display the molding condition setting screen thereon, and then waits for an operator's selection of the software keys (Step S1). At this time, the software keys function to display different types of molding defects or the absence of defects. The relationships of the software keys and the various molding defects are displayed on the screen. If any one of the software keys is operated by the operator, the PMCCPU 110 operates to store the corresponding data representing a certain type of molding defect in the corresponding memory area of the last record in the molding condition storage file of the RAM 106 (Step S2). Instead of using the software keys, a character string representing a type of molding defect may be inputted through a key operation.

After the execution of Step S2, the software keys function to display different groups of parameters constituting one set of molding conditions, and the PMCCPU 110 operates to display these functions of the software keys on the screen. If the operator operates the software key indicating a certain parameter group including a parameter to be changed, the CPU 110 operates to display the various parameters constituting this parameter group on the screen (Step S3). The operator then moves a cursor to a display position corresponding to the parameter to be changed among those displayed on the screen, presses an execution key to select the type of parameter to be changed, and inputs a parameter value by using the ten-key pad.

The PMCCPU 110 determines whether an input of a parameter value (Step S4) occured, stores data representing the type and value of the parameter concerned in the second register R (Step S5), and sets the value i of a loop counter to "1" (Step S6). The CPU 110 then reads out a value of parameters of the same type indicated by the parameter type data stored in the second register R, from a first record (in general, the i-th record Ti determined by the loop counter value $i=(1, 2, \ldots, C)$) among plural records (molding conditions) stored in the molding condition storage file of the RAM 106, as mentioned later. The CPU 110 then compares the read-out value with the parameter value stored in the register R. Similarity of these parameter values is discriminated by determining whether the difference between these values falls within a predetermined range (Step S7).

If it is decided in Step S7 that the difference between the parameter values is outside the predetermined range and accordingly there is no similarity between the parameter values, the PMCCPU 110 determines whether the value i of the loop counter is equal to the value C indicating the last record (Step S8). If the result of the determination at Step S8 is negative, that is, if the similarity discrimination for the parameter value stored in the second register R is not completed for all of the records, then "1" is added to the loop counter value i (Step S9), and Step S7 is executed again.

If, after executing the loop, consisting of Steps S7, S8 and S9, C times consecutively, it is determined that the parameter value stored in the second register R has no similarity to any of the corresponding parameter values in all of the records, in other words, if it is determined that there is no similarity between the molding condition currently input and the molding conditions already stored in the records, the parameter value in the second register is stored in the corresponding memory area in the molding condition storage region of the shared RAM 103 (Step S10).

On the other hand, if it is determined in Step S7 that there is similarity between the value stored in the second register and the corresponding parameter value in the record Ti ($i=1, 2, \ldots, C$) during the execution of the above-mentioned loop, then it is determined whether all the parameter values of the molding conditions stored in the molding condition storage region of the shared RAM 103, except for the parameter value stored in the second register R, are similar to their respective parameter values of the record (molding conditions) Ti stored in the RAM 106 (Step S11). If the result of this determination is negative, that is, if at least one of the parameter values of the molding conditions currently input has no similarity to the corresponding parameter value in the record Ti, the flow proceeds to Step S8, as in the case of a negative decision in Step S7.

If the decision in Step S11 is affirmative, in other words, if all the parameter values currently input have similarity to the corresponding parameter values in the record Ti, an alarm message indicating that similar molding conditions have already been set is displayed on the CRT display (Step S12). At this time, the parameter values of the record Ti and the defective molding data may be displayed together with the alarm message.

While the alarm message is displayed, three predetermined software keys (hereinafter referred to as the change key, the change cancel key, and the end key, respectively) function either to allow the current parameter value to be changed to inhibit any change of the parameter value, or to terminate the change process, respectively, and these functions are displayed on the screen. In the event that the alarm message is displayed, the change cancel key is usually operated (Step S13) to avoid a duplicate setting of similar molding conditions. Accordingly, the flow returns to Step S3 and waits for an operator's selection of another type of parameter. Although not illustrated, if the end key is operated in Step S13, the execution of the parameter changing/setting program is ended. In the case where a finer setting of the molding conditions is required to obtain optimum molding conditions, even though molding conditions similar to those currently input have already been set, the change key is operated while the alarm message is displayed (Step S13). The flow then returns to Step S10, and the input parameter value is stored in the molding condition storage region of the shared RAM 103.

After the execution of Step S10, two predetermined software keys (hereinafter referred to as the registration key and the change continuation key, respectively) function to either register the molding conditions stored in the molding condition storage region into the molding condition storage file of the RAM 106 or the flow to the process for changing another parameter value, respectively. These functions of the software keys are displayed on the CRT display.

If the change continuation key is operated (if the decision in Step S14 is negative), the flow returns to Step S3 and waits for an operator's operation for changing another parameter value. In the case where the operator determines that all the necessary parameter values have been changed and accordingly operates the registration key (Step S14), "1" is added to the value C of the first register (Step S15). All the parameter values stored in the molding condition storage region of the shared RAM 103, i.e., one set of molding conditions, are transferred to and stored in a new memory area of the molding condition storage file of the RAM 106 next to the last record (Step S16). The injection molding process is then carried out in accordance with the molding conditions stored in the molding condition storage region of the shared RAM 103.

As described above, the history of the processes for determining optimum molding conditions, stored in the molding condition storage file are updated while the injection molding process is repeated until non-defective molded products are obtained. When non-defective molded products are obtained, the operator gives a command to display the molding condition setting screen, and then operates the software key to specify a non-defective molding (Step S1). In response to this key operation, the PMCCPU 110 operates to store the optimum molding condition indication data in the corresponding memory area in the last record of the molding condition storage file of the RAM 106 (Step S2). At this time, one predetermined software key functions to terminate the molding condition setting process, though not illustrated in the figure, and such function is displayed on the CRT display. By operating this software key, the operator can terminate the molding condition setting process.

In the above-described embodiment, the process history for determining optimum molding conditions is stored in the RAM 106. Alternatively, an external storage device such as a hard disk, floppy disk, or the like may be connected to the operator panel controller 112, to ensure a memory capacity large enough to register numerous histories associated with various types of molds. Furthermore, a printer such as a line printer may be connected to the operator panel controller to print the history data.

According to the above embodiment, the data representing the types of molding defects is registered in the molding condition storage file, and discrimination is made as to the similarity between the input molding conditions and the registered molding conditions before the input molding conditions are registered in the storage file. These registration and discrimination processes are not essential to the invention. For example, plural sets of molding conditions constituting individual records or representing one entire history may be registered in the storage file such that they can be displayed and/or printed, for operation of determination of the optimum molding conditions.

What is claimed is:

1. A molding condition recording apparatus for an injection molding machine comprising:

first input means for changeably inputting parameters which constitute one set of molding conditions, the one set of molding conditions consisting of plural groups of parameters;

first memory means for changeably storing the parameters constituting the one set of molding conditions;

second memory means for storing a plurality of stored sets of molding conditions including one or more stored sets of molding conditions that cause defective molding, the plurality of stored sets of molding conditions stored in said second memory means representing a history of processes for determining optimum molding conditions;

second input means for inputting a command to transfer the one set of molding conditions stored in said first memory means to said second memory means as one of the plurality of stored sets of molding conditions; and control means for controlling said first and second memory means so that the one set of molding conditions is stored in said second memory means as the one of the plurality of stored sets of molding conditions in response to an operation of said first and second input means.

2. A molding condition recording apparatus according to claim 1, further comprising:

third input means for inputting data representing types of molding defects, and wherein the inputted data representing types of molding defects is stored so that the inputted data is associated with corresponding molding conditions in said second memory means.

3. A molding recording apparatus according to claim 1, further comprising:

discrimination means which is operated under control of said control means for discriminating similarity between one of the parameters inputted through said first input means and a corresponding parameter stored in said second memory means to produce a similarity discrimination each time the corresponding parameter is inputted through said first input means; and display means which is operable under the control of said control means for displaying the similarity discrimination.

4. A molding condition recording apparatus according to claim 3, wherein said display means is operable to display an alarm when said discrimination means determines that the molding condition identical with that inputted through said first input means has already been stored in said second memory means.

5. A molding condition recording apparatus according to claim 2, further comprising:

discrimination means which is operated under control of said control means for discriminating similarity between one of the parameters inputted through said first input means and a corresponding parameter stored in said second memory means to produce a similarity discrimination each time the corresponding parameter is inputted through said first input means; and display means which is operable under the control of said control means for displaying the similarity discrimination.

* * * * *

UNITED STATES PATENT AND TRADEMARK OFFICE
CERTIFICATE OF CORRECTION

PATENT NO. : 5,062,784
DATED : November 5, 1991
INVENTOR(S) : Inaba et al.

It is certified that error appears in the above-identified patent and that said Letters Patent is hereby corrected as shown below:

Column 3, line 65, change "comprises"

to --has--.

Column 7, line 26, change "or the"

to --or return the--.

Signed and Sealed this

Sixth Day of April, 1993

*Attest:*

STEPHEN G. KUNIN

*Attesting Officer*    Acting Commissioner of Patents and Trademarks